US012795179B1

(12) United States Patent
Singh et al.

(10) Patent No.: US 12,795,179 B1
(45) Date of Patent: Nov. 10, 2026

(54) COMPUTER-IMPLEMENTED METHODS FOR DUAL ORIENTATION LIVE VIDEO STREAMING FOR AN OPTIMIZED VIEWER EXPERIENCE

(71) Applicant: Amazon Technologies, Inc., Seattle, WA (US)

(72) Inventors: Alok Singh, Jersey City, NJ (US); Kareemulla Khan Sadath, Brooklyn, NY (US); Siddharth Mishra, New York, NY (US); Tushar Govil, Jersey City, NJ (US); Abhimanyu Sahai, Bellevue, WA (US); Prasanna H. Sridhar, Sammamish, WA (US); Christopher Mills, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/960,948

(22) Filed: Nov. 26, 2024

(51) Int. Cl.
*H04N 21/21* (2011.01)
*H04N 21/2187* (2011.01)
(Continued)

(52) U.S. Cl.
CPC ....... *H04N 21/2187* (2013.01); *H04N 21/235* (2013.01); *H04N 21/85* (2013.01)

(58) Field of Classification Search
CPC ... H04N 21/2187; H04N 21/235; H04N 21/85
See application file for complete search history.

(56) References Cited

U.S. PATENT DOCUMENTS 5,686,969 A * 11/1997 Baik .................... H04N 7/0122 348/556
6,104,865 A * 8/2000 Hamaguchi .......... H04N 9/7925 386/233
(Continued)

*Primary Examiner* — Timothy R Newlin
(74) *Attorney, Agent, or Firm* — NICHOLSON DE VOS WEBSTER & ELLIOTT LLP

(57) ABSTRACT

Techniques for performing dual orientation live video streaming are described. According to some examples, a computer-implemented method includes receiving, by a content creator device support service from a content creator device, a request to generate a live vertical video stream and a live horizontal video stream from a live stream of a video camera (e.g., from a same set of cameras) of the content creator device; causing, by the content creator device support service, generating of the live vertical video stream from the live stream of the video camera of the content creator device, and the live horizontal video stream from the live stream of the video camera of the content creator device; causing, by the content creator device support service, inserting of secondary content into a first location of the live vertical video to generate a first content comprising the live vertical video; causing, by the content creator device support service, inserting of the secondary content into a second location, different than the first location, of the live horizontal video to generate a second content comprising the live horizontal video; causing, by the content creator device support service, sending of the first content comprising the live vertical video to a first user device based on the first user device being a vertical display device; and causing, by the content creator device support service, sending of the second content comprising the live horizontal video to a second user device based on the second user device being a horizontal display device.

20 Claims, 14 Drawing Sheets

(51) Int. Cl.
*H04N 21/235* (2011.01)
*H04N 21/85* (2011.01)

(56) References Cited

U.S. PATENT DOCUMENTS 6,252,964 B1 * 6/2001 Wasilewski ...... H04N 21/23476 380/282
7,788,686 B1 * 8/2010 Andrews .......... H04N 21/25875 725/138
8,291,107 B1 * 10/2012 Upadhyay ............... H04L 65/80 709/224
8,565,228 B1 * 10/2013 Howard ................ H04L 12/283 370/389
10,929,979 B1 * 2/2021 Dimson ............... H04N 21/431
11,082,467 B1 * 8/2021 Hartnett ................ H04L 65/403
11,184,558 B1 * 11/2021 Zhang .................. G06V 10/255
11,297,260 B1 * 4/2022 Siu ..................... H04N 23/6812
11,985,378 B1 * 5/2024 Parkinson ............. G06F 16/955
2002/0047918 A1 * 4/2002 Sullivan ................... H04N 7/08 348/E7.024
2004/0148633 A1 * 7/2004 Skinner .............. H04N 7/17336 725/132
2005/0166249 A1 * 7/2005 Kettle .................. H04N 7/0122 348/580
2005/0190202 A1 * 9/2005 Suzuki ................. H04N 7/0122 348/E5.111
2005/0283791 A1 * 12/2005 McCarthy .......... H04N 21/4627 348/E7.056
2006/0005029 A1 * 1/2006 Petrovic ................. H04N 5/913 713/176
2006/0061687 A1 * 3/2006 Dunton .............. H04N 21/4355 348/556
2006/0119711 A1 * 6/2006 Ejima .................... H04N 5/772 348/222.1
2007/0064951 A1 * 3/2007 Unger .............. G11B 20/00086 348/E7.056
2007/0071234 A1 * 3/2007 Lagrange ......... H04N 21/43632 348/E7.056
2007/0097110 A1 * 5/2007 Inui .................... H04N 21/4882 348/E5.002
2007/0157241 A1 * 7/2007 Walker ............... H04N 21/4334 725/9
2007/0204161 A1 * 8/2007 Isozaki .............. H04N 21/4405 380/232
2008/0106641 A1 * 5/2008 Chou ................... H04N 7/0122 348/E7.003
2008/0235731 A1 * 9/2008 Bryant ............... H04N 21/4755 725/44
2011/0074910 A1 * 3/2011 King ...................... H04N 7/152 348/E7.083
2011/0193982 A1 * 8/2011 Kook ..................... H04N 23/63 348/222.1
2011/0225421 A1 * 9/2011 Han ........................ H04L 9/321 713/172
2011/0249086 A1 * 10/2011 Guo ....................... H04N 5/272 348/E7.083
2012/0169883 A1 * 7/2012 Chang .............. H04N 21/23418 348/E7.085
2012/0174157 A1 * 7/2012 Stinson, III .......... H04N 21/482 725/40
2013/0276048 A1 * 10/2013 Krasic ................ H04N 21/2187 725/116
2014/0172382 A1 * 6/2014 Andrews ................... F17D 5/00 703/2
2015/0177966 A1 * 6/2015 Ragusa .............. H04N 1/00198 345/648
2015/0271541 A1 * 9/2015 Gonder ............ H04N 21/64322 725/25
2016/0173944 A1 * 6/2016 Kilar .............. H04N 21/234327 725/12
2016/0277802 A1 * 9/2016 Bernstein ......... H04N 21/44213
2016/0366330 A1 * 12/2016 Boliek .................. G06F 3/0484
2017/0062012 A1 * 3/2017 Bloch .................... G11B 27/34
2017/0318350 A1 * 11/2017 Wielgosz .............. G06F 16/437
2019/0132627 A1 * 5/2019 Loheide ............. H04N 21/2625
2019/0174171 A1 * 6/2019 Eubanks ............ H04N 21/8126
2019/0182554 A1 * 6/2019 Schupak ............ H04N 21/4316
2019/0266980 A1 * 8/2019 Kast ........................ G09G 5/363
2019/0320211 A1 * 10/2019 Chen .................. H04N 21/2187
2020/0020071 A1 * 1/2020 Frey .......................... G06T 3/10
2020/0037010 A1 * 1/2020 Anders .............. H04N 21/2187
2020/0296317 A1 * 9/2020 Post, Jr. ............... H04N 7/0122
2020/0364727 A1 * 11/2020 Scott-Green ....... G06Q 10/0635
2021/0084372 A1 * 3/2021 Seo ................. H04N 21/47217
2021/0185273 A1 * 6/2021 Pitts ..................... H04N 7/0122
2021/0185363 A1 * 6/2021 Paiement .............. H04L 67/131
2022/0337898 A1 * 10/2022 Dorogusker ....... H04N 21/2187
2022/0358966 A1 * 11/2022 Wang ................ H04N 21/8106
2022/0365663 A1 * 11/2022 Baribault .............. G06F 3/0304
2023/0247249 A1 * 8/2023 Kim .................. H04N 21/4882 715/867
2024/0036792 A1 * 2/2024 Peng .................... H04N 21/222
2024/0205002 A1 * 6/2024 Storelli ................. H04L 9/3247
2024/0223849 A1 * 7/2024 Liu ................ H04N 21/440263
2024/0284016 A1 * 8/2024 Li ...................... H04N 21/2187
2024/0314368 A1 * 9/2024 Hsu .................... H04N 21/2187
2025/0209703 A1 * 6/2025 Goodrich ......... H04N 21/23424
2025/0240516 A1 * 7/2025 Zumbrunnen ......... G11B 27/34

* cited by examiner

COMPUTER-IMPLEMENTED METHODS FOR DUAL ORIENTATION LIVE VIDEO STREAMING FOR AN OPTIMIZED VIEWER EXPERIENCE

BACKGROUND

Content creators (such as businesses, artists, media distribution services, etc.) can employ one or more data centers to deliver content (such as web sites, web content, or other digital data) to users or clients. In the live streaming industry, content creators are to choose between one of a vertical video orientation or a horizontal video orientation. In certain examples, the vertical orientation is better suited for mobile devices, while the horizontal orientation is preferred for larger displays like desktop devices and televisions. This forces content creators to optimize for either mobile or desktop/TV, but not both simultaneously.

BRIEF DESCRIPTION OF DRAWINGS

Various examples in accordance with the present disclosure will be described with reference to the following drawings.

DETAILED DESCRIPTION

Figure 1:
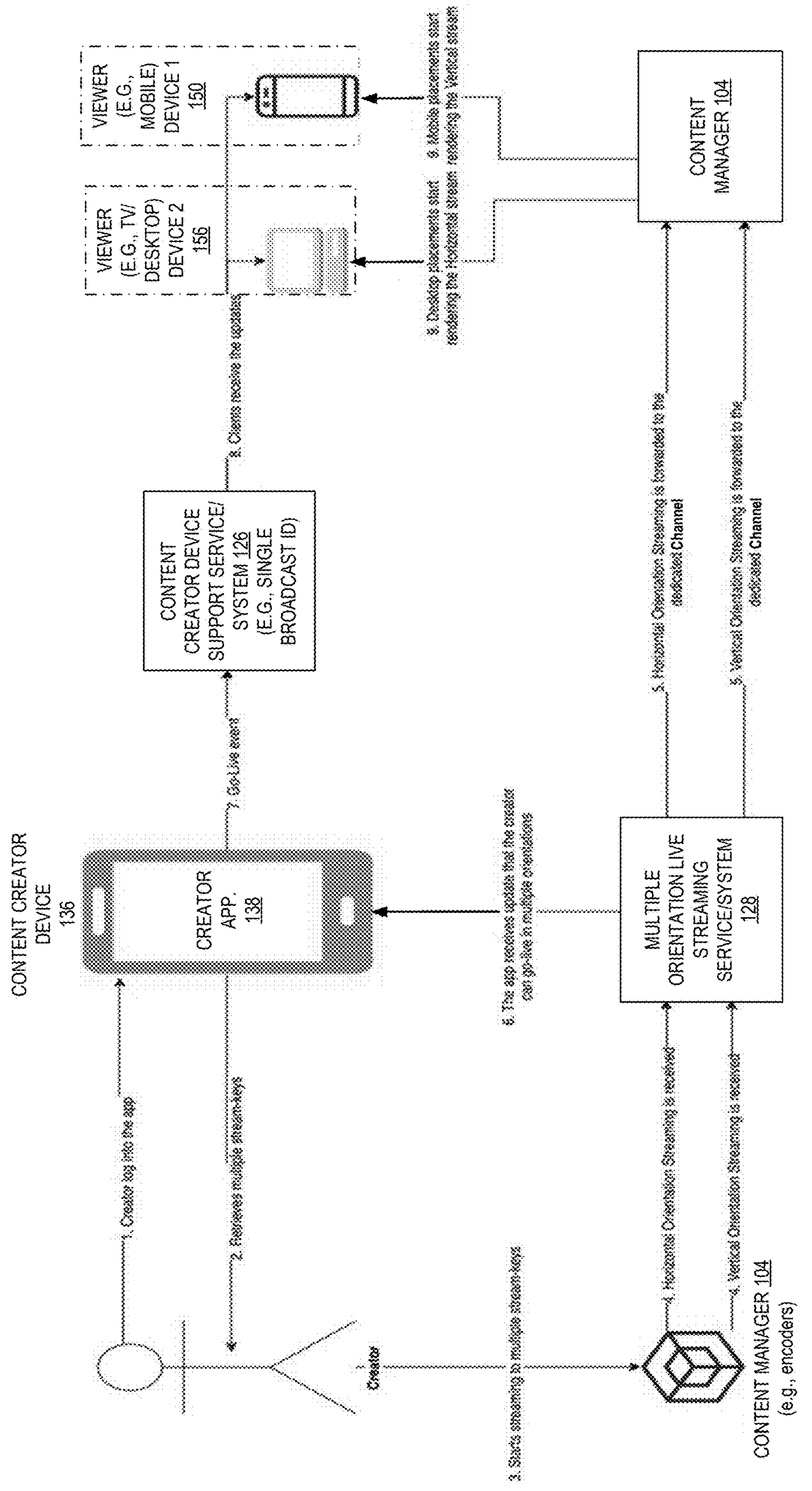
FIG. 1 is a diagram illustrating an environment including a content creator device and a content creator device support service/system to send a vertical video stream to vertical display devices and a horizontal video stream to horizontal display devices according to some examples.

The present disclosure relates to methods, apparatus, systems, and non-transitory computer-readable storage media for performing dual orientation (e.g., vertical and horizontal) live streaming. Through engaging live streams, products come to life in a product carousel, enhanced by features like product highlighting, live promotions, and interactive chat. In certain examples, a content creator application (e.g., live creator application) allows a content creator to go live with a video with secondary content (e.g., indication(s) of products and/or services) inserted into the video, but requires a single (e.g., horizontal) video orientation before the broadcast. This causes certain viewer devices to attempt to display a horizontal video on a vertical display (or a vertical video on a horizontal display). As the majority of broadcasts are currently in a horizontal orientation, this leads to cropping of the secondary content, which can negatively affect user interaction with the secondary content of the video. Given the significant increase in (e.g., primarily) vertical display (e.g., mobile phone) usage, particularly for activities like shopping and video consumption, adapting content to a vertical orientation ensures that it fits seamlessly within the user's natural viewing behavior. This transformation enhances engagement and accessibility, aligning with the way users typically hold and interact with their mobile devices, ultimately maximizing the effectiveness of content across various systems and placements.

To overcome these issues, examples herein are directed to a content creator device application (e.g., and support service/system) that sends a vertical video stream to vertical display devices and sends a horizontal video stream to horizontal display devices, e.g., generating two different outputs simultaneously so that a customer experience system can choose which orientation they want to render. To achieve this, certain examples herein intake video from a single camera setup or a same multiple camera setup (e.g., a first camera that outputs a horizontal video and a second camera that outputs a vertical video), e.g., using an external streaming service. By enabling dual orientation live streaming, the examples herein (e.g., of BiStream technology) address these key limitations in the current live streaming landscape and provide a seamless, cross-system experience for both creators and viewers. In certain examples, a content creator application (e.g., executed on the content creator device) enables a content creator to stream (e.g., a video of themselves, etc.) in both vertical and horizontal orientations simultaneously through a single broadcast within the application. In certain examples, when a viewer accesses the live stream, the correct video orientation is automatically selected based on their display system (e.g., a mobile device uses the vertical video stream and a desktop/TV uses the horizontal video stream). Certain examples herein (e.g., of BiStream technology) enable a single broadcast to be available in both horizontal and vertical formats. In certain examples, the video player or placement will automatically select the most appropriate version based on the viewer's device, e.g., a horizontal version for desktop/10-foot experiences, and a vertical version for mobile immersive view. This approach enhances the viewing experience across different systems without the need for letter-boxing or trimming content from a broadcast that is only streamed in one orientation.

Examples herein thus provide for (i) dual orientation streaming (e.g., BiStream) (e.g., a creator can choose to go live in multi-orientation at the time of broadcast setup), (ii) selectable products/services (e.g., indications for products/services added are available across both orientations and can be managed through a single click in the content creator application), (iii) unified engagement (e.g., a creator can engage with viewers through a single chat stream across both orientations), and/or (iv) consolidated metrics (e.g., a creator can view combined (e.g., and/or vertical stream or horizontal stream) viewership, revenue, and engagement data for both video orientations).

Examples herein enable a viewer's device (e.g., an end device) to make the best use of available presentation and/or display space by selecting the stream best suited for the available space. In certain examples, this also helps the viewer better find the information they are looking for, without having to switch to a different device to get the full content experience. In certain examples, this optimized viewing experience improves viewer engagement and retention and helps reduce network bandwidth by only sending the best orientation to the end device (e.g., instead of sending multiple). Examples herein provide for (i) optimized customer experience (e.g., viewers receive the best video orientation for their device, leading to higher viewership), (ii) increased interaction (e.g., higher viewership and engagement are expected to result in increased revenue and sales for featured products/services), and/or (iii) streamlined content creation (e.g., a creator can focus on a single broadcast to reach audiences on both mobile and desktop/TV systems.

Certain examples herein (e.g., of BiStream) enable a single broadcast to be available in both horizontal and vertical formats. In certain examples, the video player or placement will automatically select the most appropriate version based on the viewer's device, e.g., a horizontal version for desktop (e.g., "10-foot experiences"), and a vertical version for mobile immersive view. In certain examples, this approach enhances the viewing experience across different systems without the need for letterboxing or trimming content (e.g., the viewer device), e.g., which occurs when broadcasts can only be streamed in one orientation.

In certain examples, implementing a single broadcast in both horizontal and vertical formats is not a simple duplication of the input stream into two outputs. In certain examples, implementing a single broadcast in both horizontal and vertical formats offers creators the ability to retrieve multiple stream-keys and/or a Real-Time Messaging Protocol (RTMP) endpoint pair which they can use in single or multiple external streaming sources to generate multiple orientation streaming output without any added latency, and be available on different placements. In certain examples, implementing a single broadcast in both horizontal and vertical formats provides down-stream clients the ability to choose which orientation they want to render according to their placement specifications. In certain examples, once the live stream ends, then post-live Video-On Demand (VOD) is generated for both orientations as well which is available for the down-streams clients to consume.

For example, in certain examples, in order for a live stream to be used on a first customer experience system, the live stream is required to be in a vertical orientation, whereas in order for the same live stream to be used on a second customer experience system, the live stream is required to be in a horizontal orientation, thus blocking the live stream from appearing on both systems at the same time. Certain examples herein allow a creator to stream in two different orientations and the customer experience system is then able to choose which orientation is to be rendered according to their system requirements, e.g., allowing the created content to appear on multiple placements at the same time.

Examples herein cannot practically be performed in the human mind (with or without the use of a physical aid such as pen and paper) because the human mind (with or without the use of a physical aid such as pen and paper) is not equipped to insert secondary content into a first location of the vertical video to generate a modified vertical video, insert the secondary content into a second location, different than the first location, of the horizontal video to generate a modified horizontal video, send the modified vertical video to a first user device based on the first user device being a vertical display device, or send the modified horizontal video to a second user device based on the second user device being a horizontal display device.

The following are examples of use cases to enable support for a creator to render a live stream in multiple orientations (horizontal and vertical). As a creator: they are able to stream in multiple orientations for the same broadcast, they are able to define the orientation settings for each live stream, they are able to have separate stream keys for each orientation, they are able to use external cameras for both horizontal and vertical variants, they are able to end broadcast for both streams at same time, they are able to see both variant VODs on the content creator application after the live broadcast (e.g., "post live), and/or they are able to decide which variant to use for a clips feature. As a content provider network: it is able to tag horizontal and vertical orientations appropriately, for downstream services to consume this information and decide which variant to render, it waits for input from both variants of the stream before going live and also shows an appropriate message to creator on the application if the expected orientation does not match, and/or it is able to switch to a different stream when one of the streams is disconnected.

There can be two potential approaches to enable creators to stream in both horizontal and vertical orientations simultaneously: (1) allow creators to use multiple encoders, such as an external streaming service for horizontal streaming and the content creator app for vertical streaming or two external encoders (one for each orientation), facilitating simultaneous broadcasts in both orientations (e.g., not a transformation in the backend), and (2) implement an automatic orientation transformation in the backend, enabling seamless switching between horizontal and vertical orientations without manual intervention.

Turning now to the figures, FIG. 1 is a diagram illustrating an environment including a content creator device 136 (e.g., a mobile device) (e.g., running a content creator application 138) and a content creator device support service/system 126 to send a vertical video stream to vertical display devices 150 and a horizontal video stream to horizontal display devices 156 according to some examples.

In certain examples, the content creator, at 1 in FIG. 1, logs into the content creator application 138 running on content creator device 136 and indicates they are planning on going live (e.g., to present their content (e.g., video of themselves)) with multiple orientations per channel in a single broadcast. At 2 in FIG. 1, the content creator device 136 (e.g., via the executing content creator application 138) generates multiple (e.g., private) stream keys, e.g., where a stream key is used as a password to protect against others streaming on the content creator's channel. In certain examples, the content creator application 138 and/or content creator device 136 enables, activates, and/or selects different sensors for each stream (e.g., directional microphone arrays optimized for different orientations so that audio is accurately reproduced based on the device the viewer is using). At 3, the content creator device 136 (e.g., via the executing content creator application 138) sends a live video stream electrically coupled to the content creator device 136 to a content manager 104 to generate a horizontal live video stream and a vertical live video stream, e.g., a first encoder of the content manager 104 and/or content creator device 136 to generate a horizontal live stream and a second encoder of the content manager 104 and/or content creator device 136 to generate a vertical live stream from the same live input stream. At 4, both horizontal and vertical encoded streams are indicated as being active (e.g., are streaming) and sent to content creator device support service/system 128. In FIG. 1, the content creator device support service/system 128 sends, at 5, the horizontal live video stream and vertical live video stream to the content provider's channel, e.g., via content manager 104 (e.g., interactive video service), and sends, at 6, an indication to the content creator device 136 (e.g., the executing content creator application 138) that the content creator can go live in multiple orientations (e.g., horizontal and vertical), e.g., on a single channel. At 7, an indication that the content creator (e.g., via device 136) is going live is sent to content creator device support service/system 126, e.g., which in response, at 8, sends an indication to the vertical display devices 150 and horizontal display devices 156 that the content creator (e.g., via device 136) is live, e.g., and the content manager 104 (e.g., content delivery service thereof) sends a vertical video stream to vertical display devices 150 and a horizontal video stream to horizontal display devices 156, e.g., sends in real time.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens, e.g., in the context of a system that processes data, these terms may mean processing data as it is received as opposed to storing or persisting the data once received for processing later on.

Figure 2:
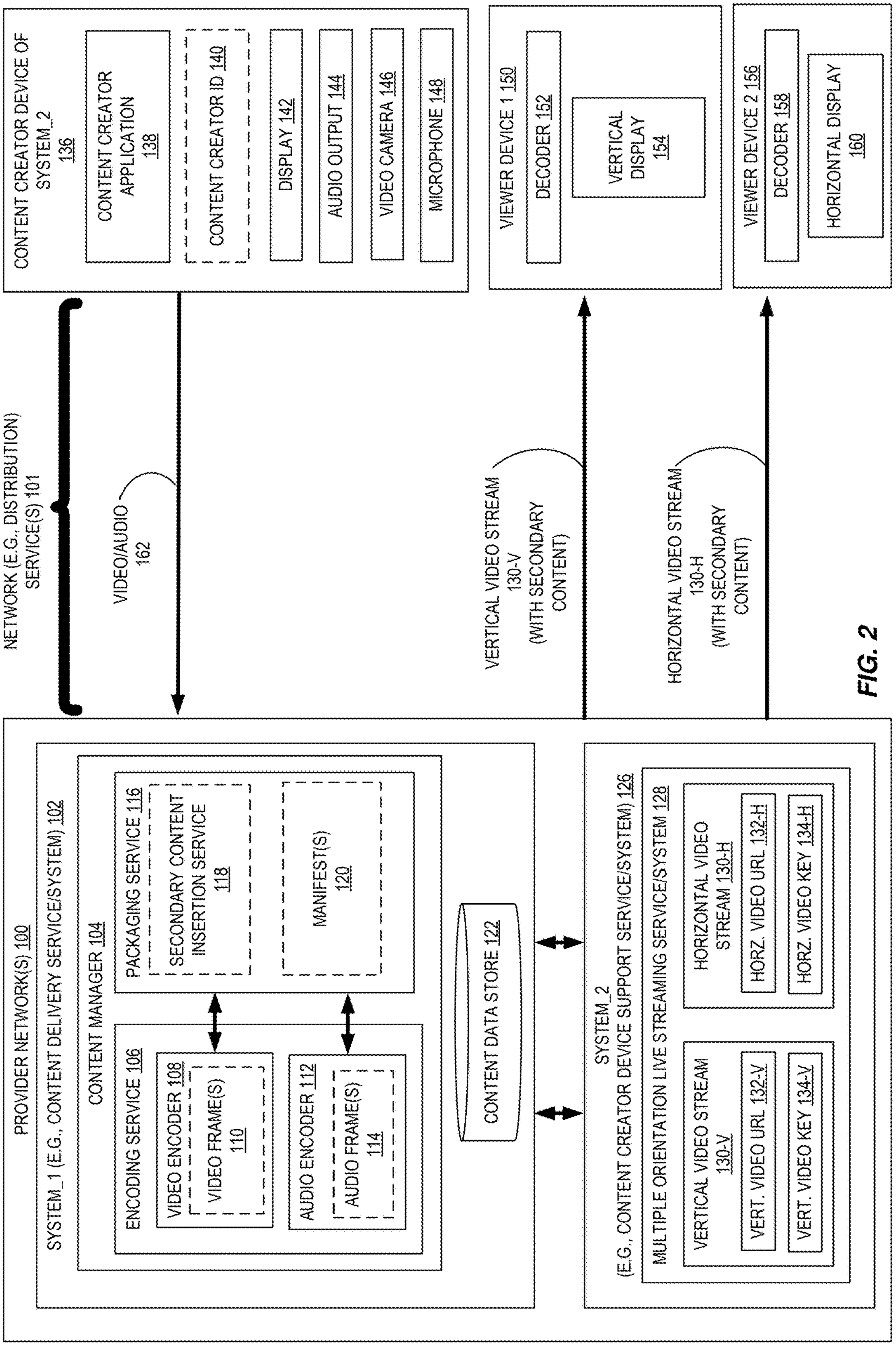
FIG. 2 is a diagram illustrating an environment including a first system (e.g., a content delivery service/system), a second system (e.g., a content creator device support service/system), a content creator device, a vertical display device and a horizontal display device according to some examples.

FIG. 2 is a diagram illustrating an environment including a first system 102 (e.g., a content delivery service/system), a second system 126 (e.g., a content creator device support service/system), a content creator device 136, a vertical display device 150 and a horizontal display device 156 according to some examples.

In certain examples, the provider network(s) 100 (e.g., cloud provider) is coupled to the content creator device 136 (e.g., of system 2) via network (e.g., distribution) service(s) 101. In certain examples, the content creator device 136 (e.g., of system 2) includes a content creator application 138, e.g., to allow for the live streaming of video 162 from video camera 146 (e.g., and audio from microphone 148) with secondary content (see FIGS. 4-5) caused to be inserted therein by the content creator. Although certain components (e.g., video camera 146 and microphone 148) are shown as part of content creator device 136, it should be understood external components (e.g., an external camera and/or external microphone) may be utilized. In certain examples, content creator device 136 (e.g., of system 2) includes a content creator identification (ID) 140, e.g., to uniquely identify the content creator (e.g., user) of that content creator device 136 (e.g., of system 2). In certain examples, a content creator device 136 (e.g., of system 2) allows each creator of a plurality of creators to have their own content creator ID 140, e.g., for accessing their content streaming account. In certain examples, the content creator application 138 includes a display 142, e.g., to view the live stream, secondary content, viewer interaction metrics, etc. In certain examples, content creator device 136 (e.g., application 138) includes a decoder to decode video for viewing on display 142 and/or audio for outputting on audio output (e.g., speaker) 144.

In certain examples, one or more viewer devices 150 include a vertical display 154 (e.g., where the width is less than the height, e.g., in a 9:16 width to height ratio), e.g., when the device 150 is oriented in its primary position. In certain examples, one or more viewer devices 150 includes a decoder 152 to decode vertical video stream 130-V with secondary content for viewing on vertical display 154 and/or audio for outputting on audio output (e.g., speaker) of device 150. In certain examples, the vertical display 154 is part of the vertical viewer device 150, e.g., a mobile device (e.g., a "smartphone" or "tablet").

In certain examples, one or more viewer devices 156 include a horizontal display 160 (e.g., where the width is greater than the height, e.g., in a 16:9 width to height ratio), e.g., when the device 156 is oriented in its primary position. In certain examples, one or more viewer devices 156 includes a decoder 158 to decode horizontal video stream 130-H with secondary content for viewing on horizontal display 160 and/or audio for outputting on audio output (e.g., speaker) of device 156. In certain examples, horizontal viewing device 156 includes a coupling (e.g., according to a standard, such as, but not limited to, a High-Definition Multimedia Interface (HDMI) standard) to horizontal display 160 (e.g., and audio output). In certain examples, the horizontal display 160 (e.g., and audio output) is separate from the horizontal display device 156, e.g., a stick media player device. In certain examples, the horizontal display 160 (e.g., and audio output) is part of the horizontal display device 156, e.g., a smart television device.

In certain examples, the content creator device 136 (e.g., executing the content creator application 138) is to cause the provider network 100, e.g., system 1 102 and/or system 2 126 of one or more cloud provider networks, to send the modified vertical video 130-V to a first user device 150 based on the first user device being a vertical display device, and send the modified horizontal video 130-H to a second user device 156 based on the second user device being a horizontal display device.

In certain examples, system 1 102 (e.g., content delivery service/system) is to encode the video 162 (e.g., and audio) to generate the modified vertical video 130-V (e.g., stream) and the modified horizontal video 130-H (e.g., stream), e.g., and send to system 2 126 (e.g., content creator device support service/system) to cause the sending of the modified vertical video 130-V to a first user device 150 based on the first user device being a vertical display device, and the sending of the modified horizontal video 130-H to a second user device 156 based on the second user device being a horizontal display device. In certain examples, a multiple orientation live streaming service/system 128 is to cause the sending of the modified vertical video 130-V to a first user device 150 based on the first user device being a vertical display device, and the sending of the modified horizontal video 130-H to a second user device 156 based on the second user device being a horizontal display device.

In certain examples, the multiple orientation live streaming service/system 128 is to, e.g., in response to a request from the content creator device 136 to send a vertical video stream to vertical display devices and a horizontal video stream to horizontal video devices (e.g., BiStream), generate vertical video stream 130-V (e.g., including a uniform resource locator (URL) 132-V for a viewer to access the vertical video stream and a (e.g., private stream) key 134-V for the vertical video stream) and a horizontal video stream 130-H (e.g., including a uniform resource locator (URL) 132-H for a viewer to access the horizontal video stream and a (e.g., private stream) key 134-H for the horizontal video stream). In certain examples, the vertical video stream 130-V is generated by a first video encoder 108 of the content manager 104 and the horizontal video stream 130-H is generated by a second video encoder 108 of the content manager 104.

In certain examples, a content data store 122 is used to store the horizontal video and the vertical video after they are streamed, e.g., as video on demand (VOD) for later viewing and/or use by one or more downstream entities.

As one example, video 162 from video camera 146 is accessed by content manger 104 (e.g., along with the indications of secondary content from the content creator device 136, one or more vertical viewer devices 150, and/or one or more horizontal viewer devices 156), which generates the vertical video stream 130-V and horizontal video stream 130-H.

As one example, a media file (e.g., including a video file and audio file) (e.g., a media container) that is to be encoded is accessed from the content data store 122 by content manager 104. In certain examples, the media file may be uploaded to content data store 122 by content provider(s) or provided directly (e.g., as live content) to content manager 104 by content provider(s) (e.g., from a live content encoder of content creator device 136).

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular viewer device 150 and/or viewer device 156. In certain embodiments, the content is stored in system 1 102 (e.g., content delivery service/system) in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a particular viewer device 150 and/or viewer device 156 is to read a manifest 120 (e.g., sent in response to a manifest request) before the client device may make a request for the media from that manifest, and thus access media files (e.g., audio fragments and corresponding video fragments) from content data store 122.

In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to generate vertical video stream 130-V and horizontal video stream 130-H in parallel. In certain examples, secondary content insertion service 118 adds secondary content (e.g., indication(s) of products/services and/or a chat window) into a main content. In certain examples, encoding service 106 is to encode both the main content and secondary content, e.g., and the secondary content insertion service 118 is to insert the secondary content into the main content.

In certain examples, the content creator device 136 includes a user interface (e.g., graphical user interface that is displayed on display 142) to control the creating and/or sending of the modified vertical video 130-V to a first user device 150 (e.g., based on the first user device being a vertical display device), and the creating and/or sending of the modified horizontal video 130-H to a second user device 156 (e.g., based on the second user device being a horizontal display device). In certain examples, the user interface allows the content creator to select if they want to stream in single or multiple (e.g., BiStream) orientation. In certain examples, if they select the multi-orientation mode, the content creator will be able to retrieve multiple stream-keys and use the (e.g., external) encoders to stream to multiple targets.

In certain examples, the content creator application 138 includes one or more of the following application programming interface (API) calls:

POST/{showId}/ingestEndpoint?requestedKeys=2

This is a public facing API that retrieves the ingest endpoint including the (e.g., RTMP) URL, stream key for each orientation, etc. In certain examples, the parameter "requestedKeys" determines the number of keys to create/retrieve based on the selection on the broadcast screen (e.g., GUI) in the application.

GET/poller?fields=broadcast,account,stream

This is a public facing API that retrieves stream metadata including key frame interval, video bitrate, height, width, etc. In certain examples, this information is used by the content creator application to validate the stream metadata in real time (or near-real time) prior to going live.

CreateBroadcast

This is an internal (e.g., to the content creator application and its support service(s)) API that creates a broadcast and stores a record in a data structure (e.g., table).

GetIngestEndpoint/GetOrCreateStreamKey

This is an internal (e.g., to the content creator application and its support service(s)) API that creates and/or retrieves the ingest endpoint (e.g., live video from the content creator) from the data structure (e.g., table). In certain examples, if the requested number of stream keys are not available, the content creator application and/or its support service(s)) first creates a (e.g., interactive video service) channel for the content creator (e.g., for the viewers to watch) and stores a map of the stream key and the channel configuration in the data structure (e.g., table).

HandleStreamMetadata

This is an internal (e.g., to the content creator application and its support service(s)) API that handles stream metadata updates such as video bitrate, etc. when the stream is started. In certain examples, this API validates if the stream key is valid and if so, updates the corresponding data store with the appropriate metadata that is retrieved via/poller API in the content creator application.

GetStreamsByShowId

This is an internal (e.g., to the content creator application and its support service(s)) API that retrieves the list of stream keys for a given channel/show.

StartBroadcast/StopBroadcast

This is an internal (e.g., to the content creator application and its support service(s)) API that starts and stops the broadcast, e.g., and triggers the upload of post live variants to a content data store (e.g., for VOD).

StopStream

This is an internal (e.g., to the content creator application and its support service(s)) API that stops forwarding the stream, e.g., forwarding the stream from the content creator device to the multiple orientation live streaming service.

UpdateBroadcastVariants

This is an internal (e.g., to the content creator application and its support service(s)) API that updates the post live broadcast variants in the database. In certain examples, there can be numerous (e.g., up to 4) post live variants (four being POST_LIVE_HLS and POST_LIVE_MP4 for each orientation).

Generating Multiple Stream Keys

In certain examples, a content creator uses a stream key to start their broadcast. To support multiple orientations per channel in a single broadcast, certain examples herein generate and store two stream keys for a creator, e.g., one for each orientation. In certain examples, multiple stream keys for a single broadcast are generated as soon as the content creator logs into the application (e.g., content creator application 138) so that the stream keys are available prior to creating the broadcast (e.g., to minimize the latency for these operations). In certain examples, the vertical and horizontal stream keys are used to render the streams in their respective orientation.

Figure 3:
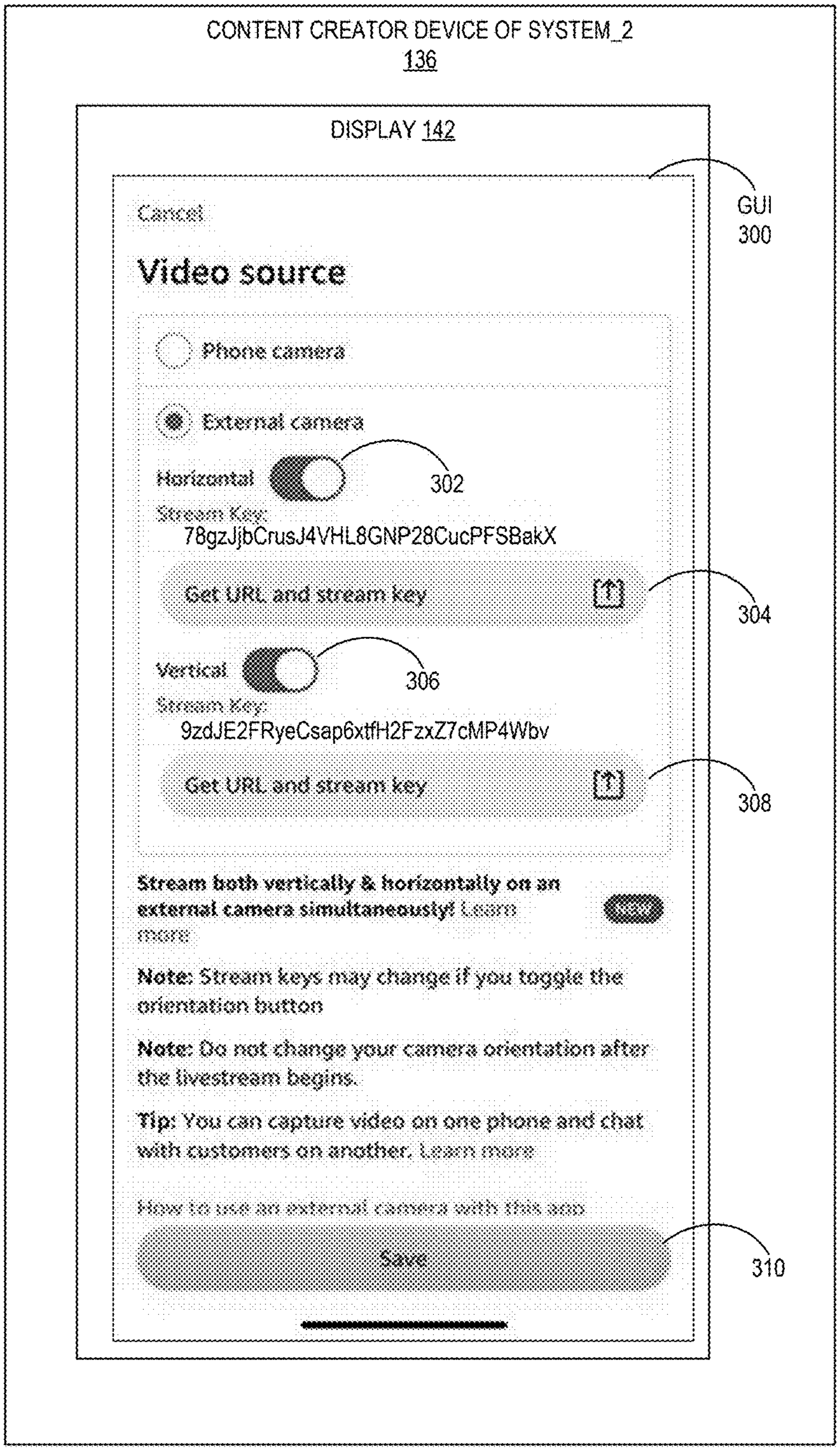
FIG. 3 is a diagram illustrating a graphical user interface of a content creator device for sending a vertical video stream to vertical display devices and a horizontal video stream to horizontal display devices according to some examples.

FIG. 3 is a diagram illustrating a graphical user interface 300 of a content creator device 136 for sending a vertical video stream to vertical display devices and a horizontal video stream to horizontal display devices according to some examples. Certain examples of live streaming (e.g., via a content creator application/device) require a (e.g., private) stream key to start the broadcast. In certain examples, the stream key is a per stream granularity, so utilizing a separate stream for a horizontal oriented video and a separate stream for a vertical oriented video causes the use of separate stream keys (e.g., one stream key for the horizontal live stream and another stream key for the vertical live stream).

In certain examples, graphical user interface 300 allows the content creator to select (e.g., via interface element 302) generating a horizontal video stream and select (e.g., via interface element 306) simultaneously generating a vertical video stream.

In certain examples, graphical user interface 300 allows the content creator to obtain (e.g., copy) a URL and stream key for the vertical live video (e.g., via interface element 304) and a URL and stream key for the horizontal live video (e.g., via interface element 308). In certain examples, selecting both "horizontal stream" interface element 302 and "vertical stream" interface element 306 causes the content creator device 136 to enter into the (e.g., BiStream) mode for sending a vertical video stream to vertical display devices and a horizontal video stream to horizontal display devices for the same input video stream.

In certain examples, the graphical user interface 300 displays to the content creator the URL and/or the stream key for the vertical live video and the URL and/or the stream key for the horizontal live video. For example, to use the URLs and/or stream keys in content manager 104 (e.g., a live vertical video encoder and a live horizontal video encoder thereof).

In certain examples, a "save" interface element 310 is included to save the selections.

Live

In certain examples, once the content creator is live, the down-stream service(s) will receive the updates with the relevant metadata indicating that the streaming orientation is marked as "MULTI_ORIENTATION". In certain examples, viewers (e.g., customers) will view the vertical version of a stream in mobile immersive view, and the Horizontal version on (e.g., all) other surfaces. In certain examples, during a livestream, viewers enjoy a seamless video playback experience and interactive features like chat and live carousel highlights.

Figure 4:
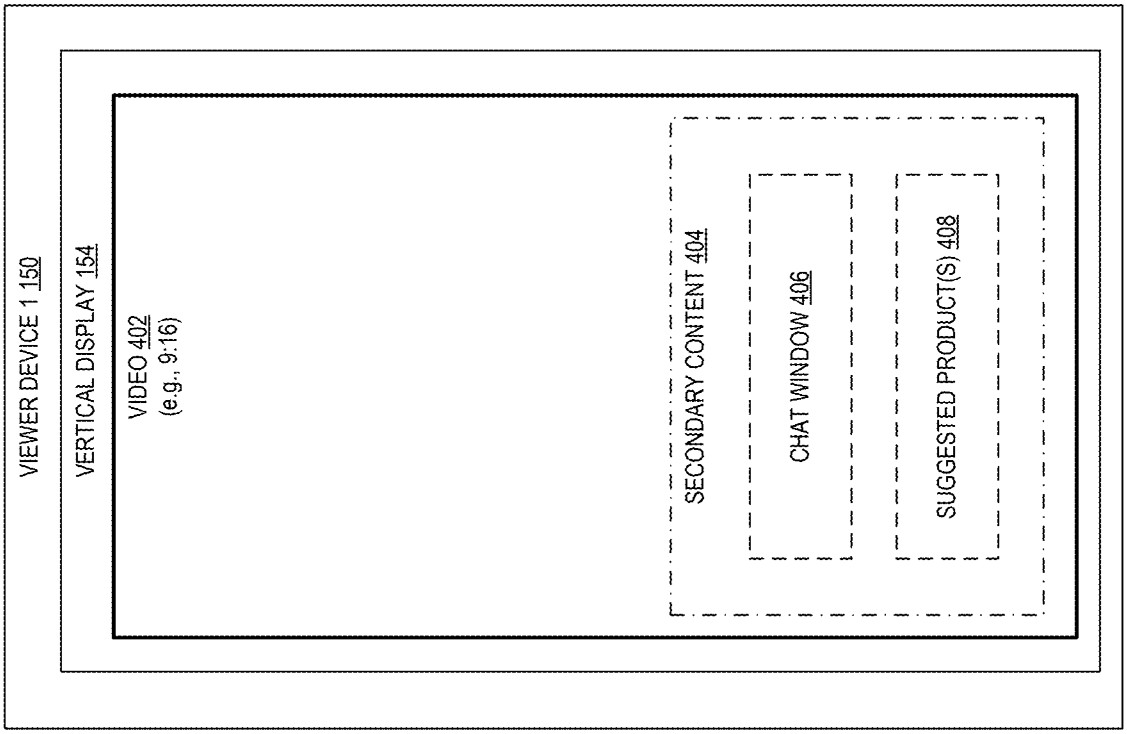
FIG. 4 is a diagram illustrating a vertical display device including a vertical display to display video and secondary content according to some examples.

FIG. 4 is a diagram illustrating a vertical display device 150 including a vertical display 154 to display video 402 and secondary content 404 (e.g., overlaid over the video 402) according to some examples. In certain examples, the secondary content 404 includes a chat window 406, e.g., to allow the content creator to send messages to and receive messages from the content creator (e.g., content creator device). In certain examples, the messages from a horizontal device user are also displayed in the chat window 406. In certain examples, the secondary content 404 includes suggested product(s) 408 and/or service(s), e.g., as selected by the content creator device.

Figure 5:
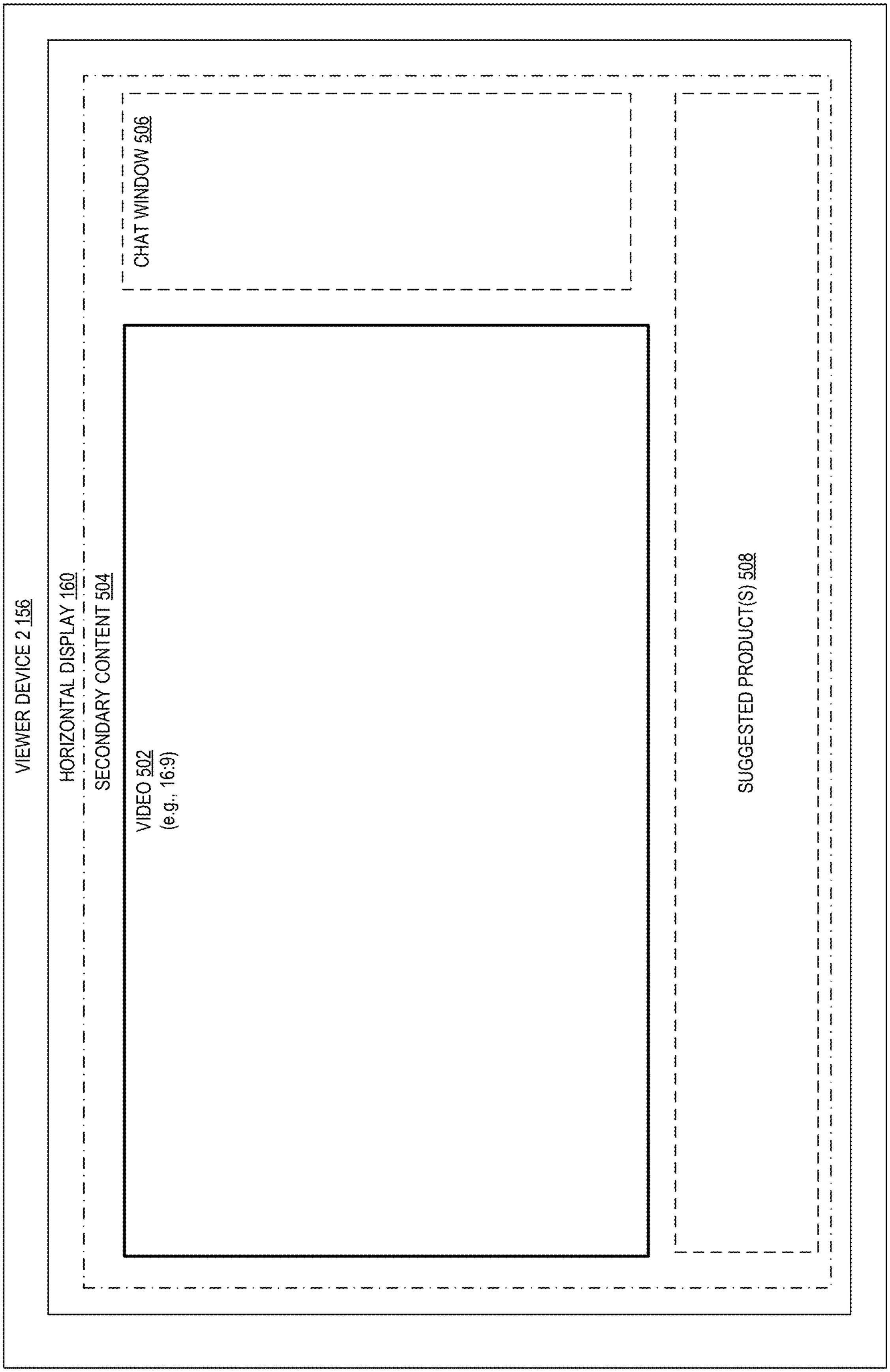
FIG. 5 is a diagram illustrating a horizontal display device including a horizontal display to display video and secondary content according to some examples.

FIG. 5 is a diagram illustrating a horizonal display device 156 including a horizonal display 160 to display video 502 and secondary content 504 (e.g., not overlaid over the video 502) according to some examples. In certain examples, the secondary content 404 includes a chat window 506 (e.g., displayed adjacent to the video 502), e.g., to allow the content creator to send messages to and receive messages from the content creator (e.g., content creator device). In certain examples, the messages from a vertical device user are also displayed in the chat window 506. In certain examples, the secondary content 504 includes suggested product(s) 508 and/or service(s) (e.g., displayed adjacent to the video 502), e.g., as selected by the content creator device. In certain examples, for a same video stream being streamed to vertical display 154 and horizontal display 160, the chat window 406 and chat window 506 have different sizes and/or locations within their display, but they display the same content to provide a uniform interaction of the content provider with their viewers. In certain examples, for a same video stream being streamed to vertical display 154 and horizontal display 160, the suggested product(s) 408 and suggested product(s) 508 have different sizes and/or locations within their display, but they display the same content to provide a uniform presentation of these product(s) by the content provider to their viewers.

On the content creator experience, the BiStream feature allows creators to broadcast both horizontal and vertical versions of the same stream under a single broadcast ID in certain examples. In certain examples, creators can interact with their audience through a shared chat room that is common across both the horizontal and vertical stream formats, e.g., allowing for a seamless and unified interaction between the content creator and viewers, regardless of the device being used to access the live content.

On the viewer experience, the BiStream feature allows the viewer (e.g., customer) to view the same broadcast in Vertical version of a stream in mobile immersive view, and the Horizontal version on (e.g., all) other surfaces. In certain examples, during a livestream, viewers enjoy a seamless video playback experience and interactive features like chat, live carousel highlights, etc.

Stream Metadata Validation Prior To Going Live

With the addition of multi-orientation support, in certain examples it is crucial to validate the stream metadata, e.g., including key frame interval, video bit rate, and height/width for both streams, to ensure that each stream is delivering content in the correct orientation. This presents a challenge in certain examples where the content creator application is to continuously poll for real-time stream data and display appropriate messages if any validation issues arise. In certain examples, this process also causes the stream to be accurately marked with the appropriate metadata, e.g., to allow dependent services to render the broadcast correctly.

Figure 6:
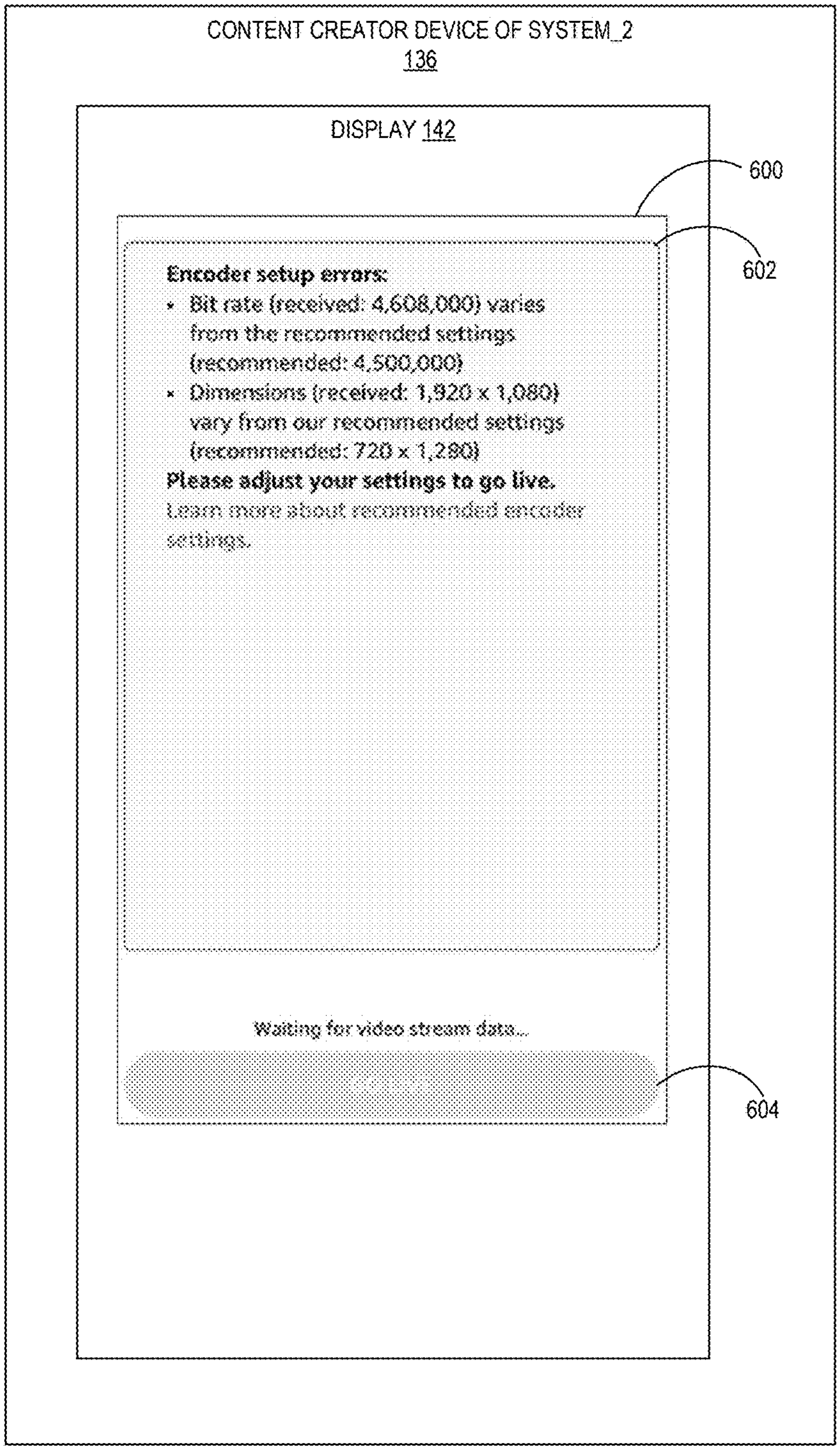
FIG. 6 is a diagram illustrating a graphical user interface of a content creator device for stream (e.g., metadata) validation prior to sending a live vertical video stream to vertical display devices and a live horizontal video stream to horizontal display devices according to some examples.

FIG. 6 is a diagram illustrating a graphical user interface 600 of a content creator device 136 for stream (e.g., metadata) validation prior to sending a live vertical video stream to vertical display devices and a live horizontal video stream to horizontal display devices according to some examples.

In certain examples, the content creator application renders an indication (e.g., banner 602) prior to going live in response to one (or both) of the stream's metadata not being valid, e.g., to prevents the content creator from going live with improper stream attributes.

In certain examples, the content creator application renders an indication (e.g., interface element 604) prior to going live in response to one (or both) of the stream's metadata being valid, e.g., such that selecting the indication will cause the live stream to be sent to the vertical viewer device(s) and horizontal viewer device(s).

Stream Metadata Validation During Live (e.g., Handling Stream Starvation for Individual Horizontal and Vertical Streams During Live)

In certain examples, starvation occurs when a stream is intermittently disconnected during a live broadcast. In certain examples herein, since the horizontal and vertical orientations are streamed separately, there is a possibility that one of the streams might experience starvation. Certain examples herein detect this issue (e.g., in real time) so that the content creation application and/or content creators can be alerted to potential (e.g., network) problems and address them during the live broadcast.

Figure 7:
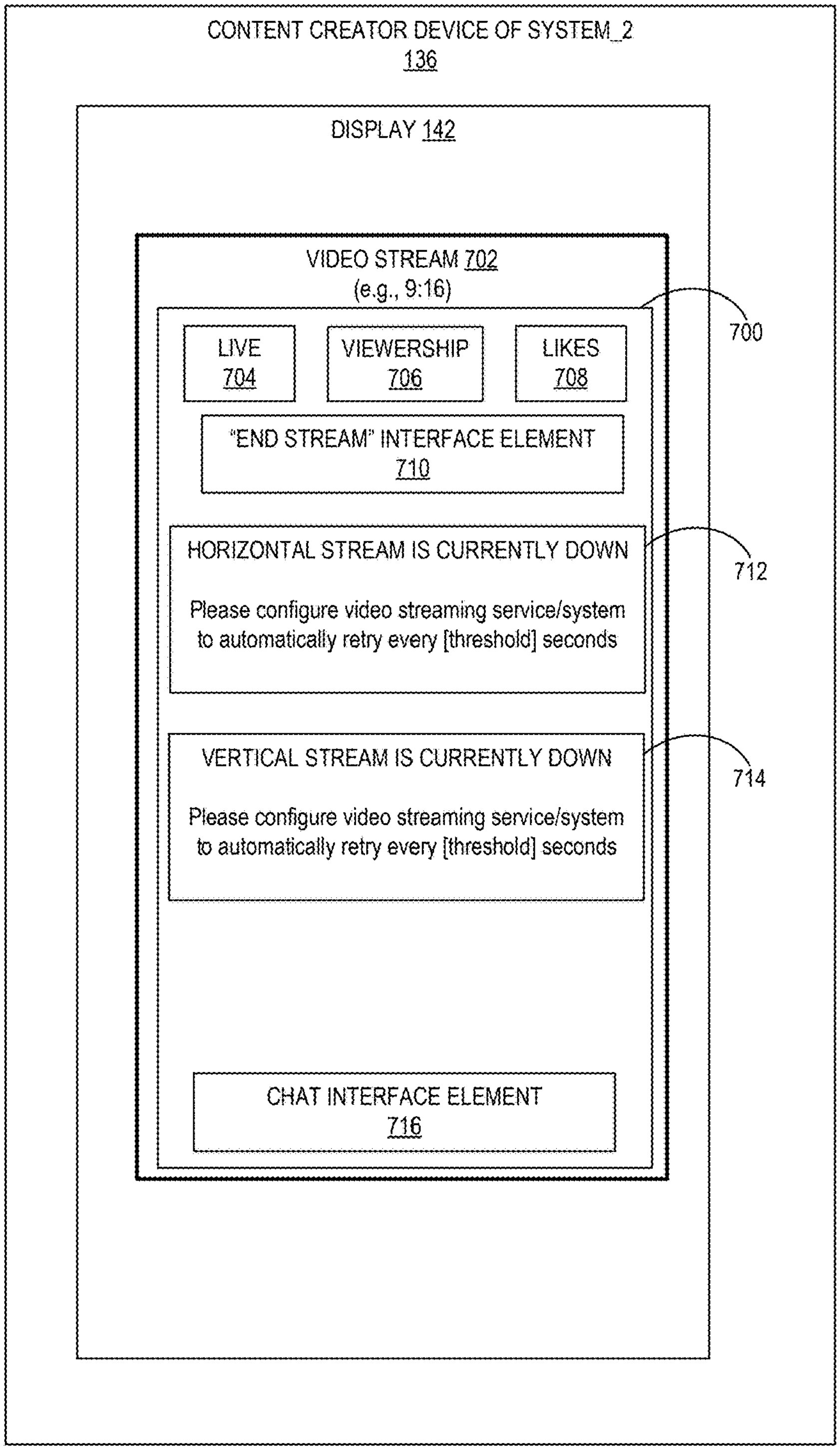
FIG. 7 is a diagram illustrating a graphical user interface of a content creator device for stream failure during sending a live vertical video stream to vertical display devices or a live horizontal video stream to horizontal display devices according to some examples.
Figure 8:
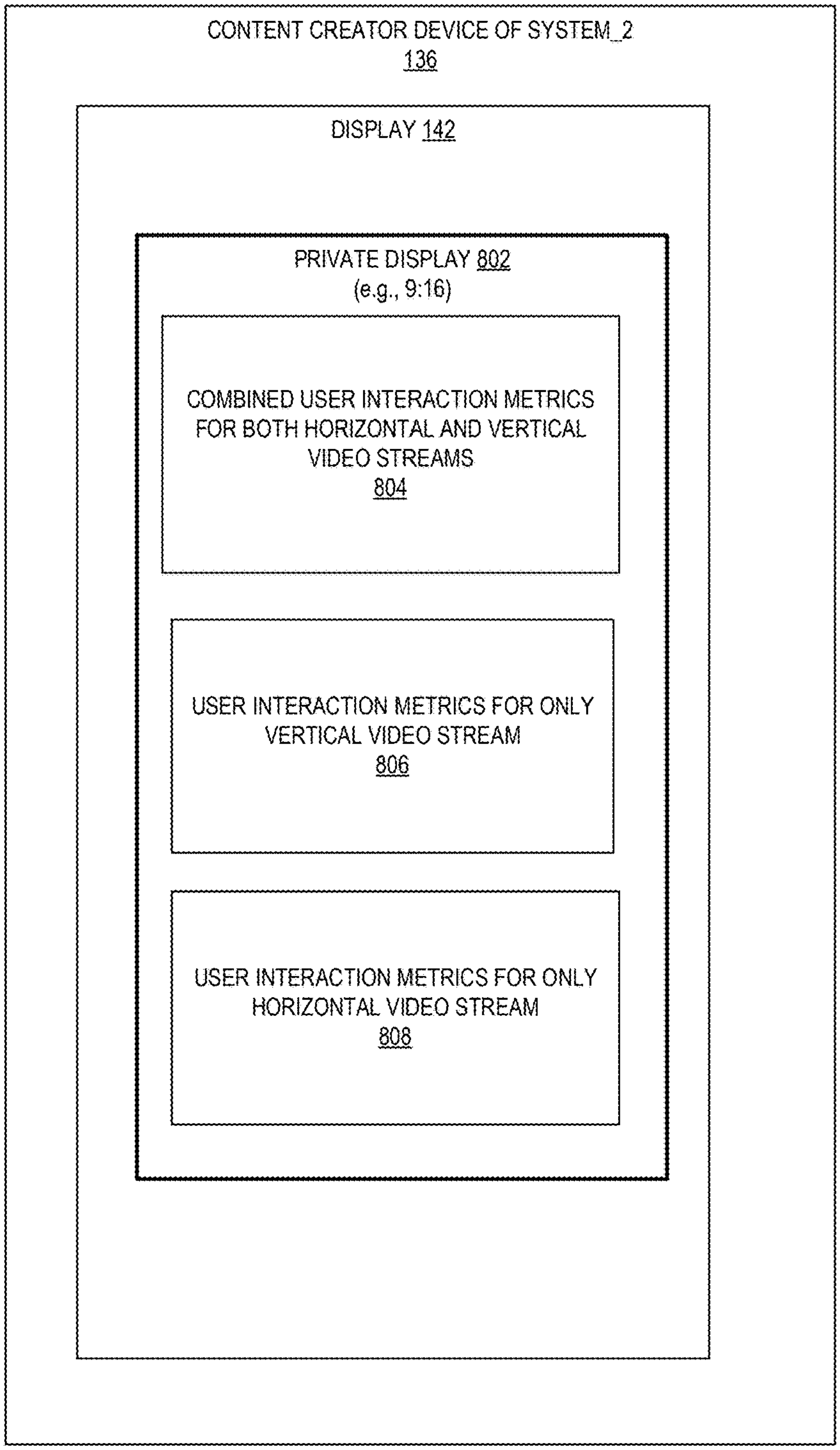
FIG. 8 is a diagram illustrating a graphical user interface of a content creator device for viewing combined user interaction metrics for a vertical video stream and a horizontal video stream, user interaction metrics for only the vertical video stream, and user interaction metrics for only the horizontal video stream according to some examples.

FIG. 7 is a diagram illustrating a graphical user interface 700 of a content creator device 136 for stream failure during sending a live vertical video stream to vertical display devices or a live horizontal video stream to horizontal display devices according to some examples. In certain examples, the content creator device includes a display 142 that shows the video stream 702 (e.g., vertical video stream being presented to a viewer) with one or more elements (e.g., overlaid over the video stream 702) of the graphical user interface 700. Depicted elements includes a live indication 704 (e.g., that indicates when the stream is being live broadcast), viewership 706 data (e.g., total number of viewer devices), likes 708 (e.g., or other indication of user interaction), an "end stream" interface element 710 (e.g., that when selected ends the live broadcast), and a "chat interface element 716 (e.g., to response in the chat windows to viewers), although any one or combination may be utilized.

In certain examples, the content creator application validates if either the horizontal stream or the vertical stream is experiencing a starvation event during a live broadcast, e.g., and renders an appropriate "horizontal stream is currently down" banner 712 or "vertical stream is currently down" banner 714 to notify the content creator.

Uploading Post Live Variants with Unique Keys

In certain examples, after a multi-orientation broadcast ends, there will be a version of the vertical stream and a version of the horizontal stream. In other examples, there will be four variants of the broadcast: two HLS variants (one for each orientation) and two MP4 variants (also one for each orientation). In a single orientation example, a (e.g., HLS) variant is uploaded to a content data store, e.g., in a path of <channelId>/<broadcastId>. With the addition of multiple (e.g., HLS) variants, certain examples herein upload these variants to the content data store separately, e.g., in a path of <channelId>/<broadcastId>/<uniqueKey>.

In certain examples, the broadcast will be made available to the public, so the stream key is not to be used in the path, e.g., to prevent unauthorized streaming of the content. Instead, a random uniqueKey (e.g., UUID) is generated and mapped to the appropriate orientation in the content data store.

Ability to View Both Customer-Facing Post Live Videos on the Creator App

In certain examples, after the broadcast is complete, a creator can view both the horizontal and vertical variant of the broadcast on the creator application, e.g., through an interface that allows switching between viewing the horizontal stream and the vertical stream on the creator's display.

User Interaction Metrics

In certain examples, content creator device 136 includes a private display 802 (e.g., not streamed to a viewer) to indicate combined user interaction metrics for both horizontal and vertical video streams 804, user interaction metrics for only vertical video streams 806 (e.g., vertical video devices), and user interaction metrics for only horizontal video streams 808 (e.g., horizontal video devices). In certain examples, the user interaction metrics include product click through rates, product sales, number of chat messages sent, etc.

Multiple Slate Images

While setting up a broadcast, in certain examples the creator has an option to upload a slate image to render on the client system. Certain examples herein provide an option (e.g., via the content creator application) for creators to upload multiple slate images per broadcast, e.g., allowing for one image for each orientation.

Example Operations

Figure 9:
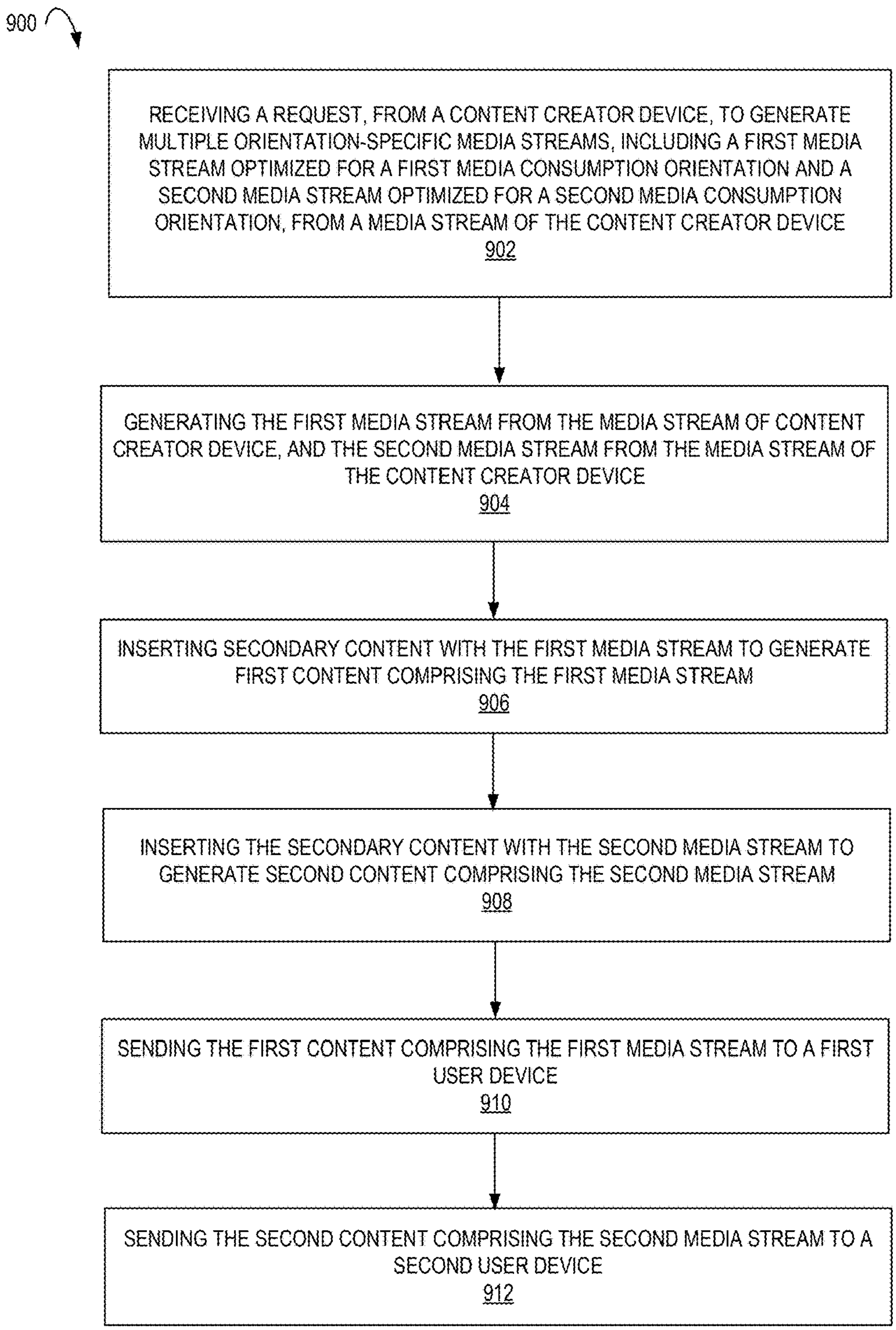
FIG. 9 is a flow diagram illustrating operations of a method of performing dual orientation live streaming according to some examples.

FIG. 9 is a flow diagram illustrating operations 900 of a method of performing dual orientation live streaming according to some examples. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 900 are performed by content creator device 136 (e.g., content creator application 138) and/or other services (e.g., implemented in a provider network) of the other figures.

The operations 900 include, at block 902, receiving a request, from a content creator device, to generate multiple orientation-specific media streams, including a first media stream optimized for a first media consumption orientation (e.g., portrait orientation) and a second media stream optimized for a second media consumption orientation (e.g., landscape orientation), from a media stream of the content creator device. The operations 900 further include, at block 904, generating the first media stream from the media stream of the content creator device, and the second media stream from the media stream of the content creator device. The operations 900 further include, at block 906, inserting additional content with the first media stream to generate first content comprising the first media stream. The operations 900 further include, at block 908, inserting the additional content with the second media stream to generate second content comprising the second media stream. The operations 900 further include, at block 910, sending the first content comprising the first media stream to a first user device (e.g., based on the first user device being a first display device) optimized for presentation of the first media consumption orientation. The operations 900 further include, at block 912, sending the second content comprising the second media stream to a second user device (e.g., based on the second user device being a second display device optimized for presentation of the second media consumption orientation).

In other examples, operations 900 include: receiving a request, from a content creator device, to generate multiple aspect ratio-specific media streams, including a first media stream optimized for a first aspect ratio and a second media stream optimized for a second aspect ratio (e.g., wherein the first aspect ratio has a greater height-to-width ratio than the second aspect ratio), from a media stream of the content creator device; generating the first media stream from the media stream of the content creator device, and the second media stream from the media stream of the content creator device; inserting additional content with the first media stream to generate first content comprising the first media stream; inserting the additional content with the second media stream to generate second content comprising the second media stream; sending the first content comprising the first media stream to a first user device (e.g., based on the first user device being a first display device); and sending the second content comprising the second media stream to a second user device (e.g., based on the second user device being a second display device).

At least some examples of the disclosed technologies can be described in view of the following examples:

Example 1. A computer-implemented method comprising:

receiving, by a content creator device support service from a content creator device, a request to generate a live vertical video stream and a live horizontal video stream from a live stream of a video camera (e.g., from a same set of cameras) of the content creator device;

causing, by the content creator device support service, generating of the live vertical video stream from the live stream of the video camera of the content creator device, and the live horizontal video stream from the live stream of the video camera of the content creator device;

causing, by the content creator device support service, inserting of secondary content into a first location of the live vertical video to generate a first content comprising the live vertical video;

causing, by the content creator device support service, inserting of the secondary content into a second location, different than the first location, of the live horizontal video to generate a second content comprising the live horizontal video;

causing, by the content creator device support service, sending of the first content comprising the live vertical video to a first user device based on the first user device being a vertical display device; and causing, by the content creator device support service, sending of the second content comprising the live horizontal video to a second user device based on the second user device being a horizontal display device.

Example 2. The computer-implemented method of example 1, wherein the generating the live vertical video stream comprises generating a first private stream key for the live vertical video stream for a broadcast identification value for the live stream, and wherein the generating the live horizontal video stream comprises generating a second private stream key, different than the first private stream key, for the live horizontal video stream for the broadcast identification value for the live stream.

Example 3. The computer-implemented method of example 1, wherein the secondary content comprises a chat window for the content creator device, the first user device, and the second user device.

Example 4. A computer-implemented method comprising:

receiving a request, from a content creator device, to generate multiple orientation-specific media streams, including a first media stream optimized for a first media consumption orientation and a horizontal media stream optimized for a second media consumption orientation, from a media stream of the content creator device;

generating the first media stream from the media stream of content creator device, and the horizontal media stream from the media stream of the content creator device;

inserting additional content with the first media stream to generate first content comprising the first media stream;

inserting the additional content with the horizontal media stream to generate second content comprising the horizontal media stream;

sending the first content comprising the first media stream to a first user device optimized for presentation of the first media consumption orientation; and sending the second content comprising the horizontal media stream to a second user device optimized for presentation of the second media consumption orientation (e.g., a different type of device than the first user device).

Example 5. The computer-implemented method of example 4, wherein the generating the first media stream comprises generating a first private stream key for the first media stream for a broadcast identification value for the stream, and wherein the generating the horizontal media stream comprises generating a second private stream key, different than the first private stream key, for the horizontal media stream for the broadcast identification value for the stream.

Example 6. The computer-implemented method of example 5, wherein the first private stream key for the first media stream and the second private stream key for the horizontal media stream are generated in response to a same request to generate the broadcast identification value.

Example 7. The computer-implemented method of example 4, further comprising presenting, to the content creator device, a single user interface element of a user interface to select simultaneous streaming of the first media stream and the horizontal media stream.

Example 8. The computer-implemented method of example 7, wherein selecting, via the single user interface element of the user interface, the simultaneous streaming of the first media stream and the horizontal media stream causes the inserting of the additional content, and the inserting of the additional content.

Example 9. The computer-implemented method of example 7, further comprising providing, via the user interface, a first private stream key for the first media stream and a second private stream key for the horizontal media stream.

Example 10. The computer-implemented method of example 4, further comprising:

validating the first media stream prior to sending the first content comprising the first media stream to the first user device;

validating the horizontal media stream prior to sending the second content comprising the horizontal media stream to the second user device; and presenting a single user interface element, in a user interface of the content creator device in response to successful validations of the first media stream and the horizontal media stream, that causes the sending of the first content comprising the first media stream and the sending of the first content comprising the horizontal media stream in response to selection.

Example 11. The computer-implemented method of example 4, further comprising:

validating the first media stream during the sending of the first content comprising the first media stream to the first user device;

validating the horizontal media stream during the sending of the second content comprising the horizontal media stream to the second user device;

presenting, in a user interface of the content creator device in response to an unsuccessful validation of the first media stream, an indication of the unsuccessful validation of the first media stream; and presenting, in the user interface of the content creator device in response to an unsuccessful validation of the horizontal media stream, an indication of the unsuccessful validation of the horizontal media stream.

Example 12. The computer-implemented method of example 4, wherein the additional content comprises a chat window for the content creator device, the first user device, and the second user device.

Example 13. The computer-implemented method of example 4, wherein the additional content comprises an indication of a product or service displayed on the content creator device, the first user device, and the second user device.

Example 14. The computer-implemented method of example 4, further comprising presenting, in a user interface of the content creator device, combined user interaction metrics for the first content comprising the first media stream and the second content comprising the horizontal media stream.

Example 15. A non-transitory computer-readable medium storing code that, when executed by a device, causes the device to perform a method comprising:

receiving a request, from a content creator device, to generate multiple orientation-specific media streams, including a first media stream optimized for a first media consumption orientation and a horizontal media stream optimized for a second media consumption orientation, from a media stream of the content creator device;

generating the first media stream from the media stream of the content creator device, and the horizontal media stream from the media stream of the content creator device;

inserting additional content with the first media to generate first content comprising the first media stream;

inserting the additional content with the horizontal media to generate second content comprising the horizontal media stream;

sending the first content comprising the first media stream to a first user device optimized for presentation of the first media consumption orientation; and sending the second content comprising the horizontal media stream to a second user device optimized for presentation of the second media consumption orientation.

Example 16. The non-transitory computer-readable medium of example 15, wherein the generating the first media stream comprises generating a first private stream key for the first media stream for a broadcast identification value for the stream, and wherein the generating the horizontal media stream comprises generating a second private stream key, different than the first private stream key, for the horizontal media stream for the broadcast identification value for the stream.

Example 17. The non-transitory computer-readable medium of example 15, wherein the method further comprises presenting, to the content creator device, a single user interface element of a user interface to select simultaneous streaming of the first media stream and the horizontal media stream.

Example 18. The non-transitory computer-readable medium of example 15, wherein the additional content comprises a chat window for the content creator device, the first user device, and the second user device.

Example 19. The non-transitory computer-readable medium of example 15, wherein the additional content comprises an indication of a product or service displayed on the content creator device, the first user device, and the second user device.

Example 20. The non-transitory computer-readable medium of example 15, wherein the method further comprises presenting, in a user interface of the content creator device, combined user interaction metrics for the first content comprising the first media stream and the second content comprising the horizontal media stream.

Exemplary environments, systems, etc. that the above may be used in are detailed below.

Figure 10:
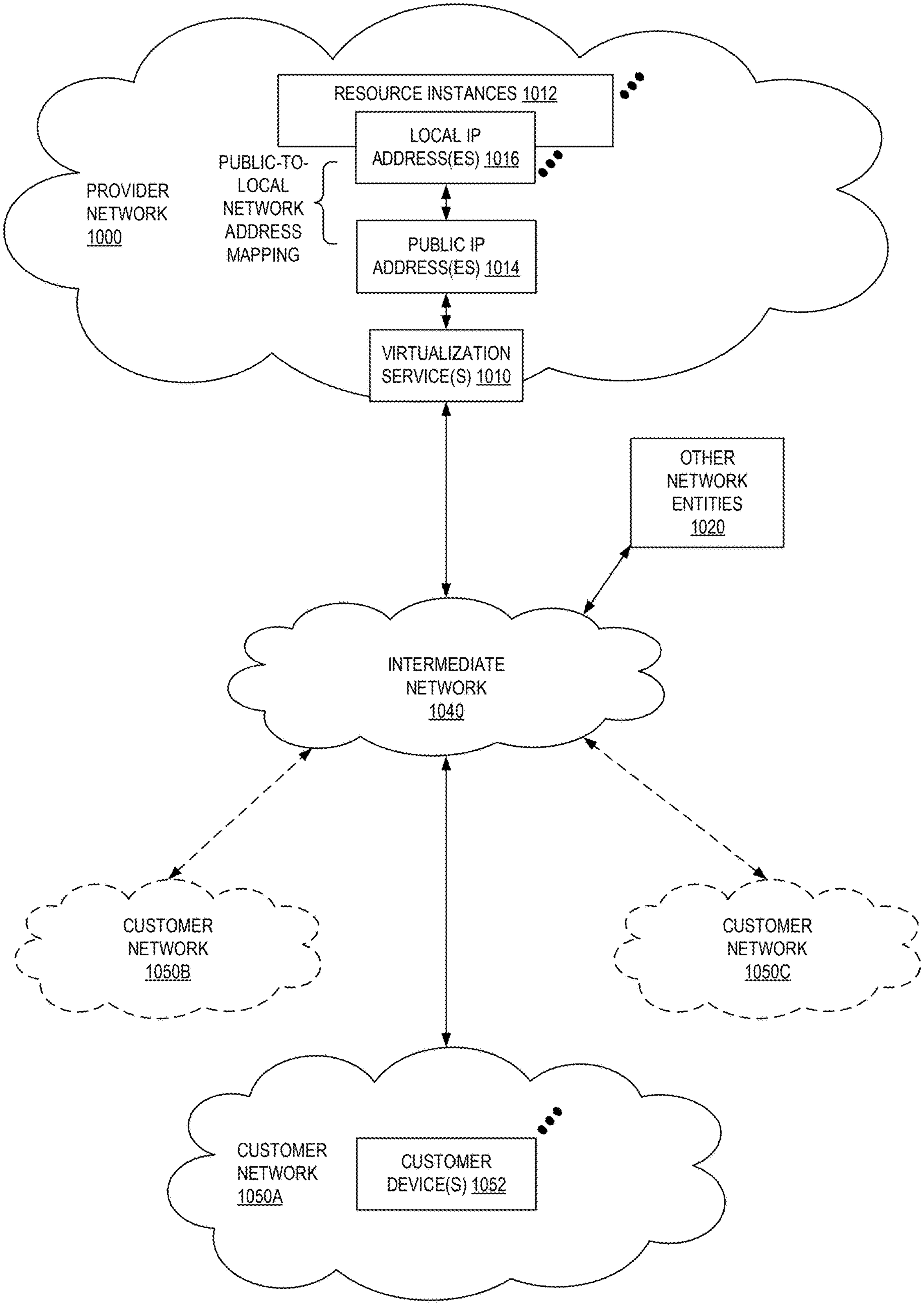
FIG. 10 illustrates an example provider network environment according to some examples.

FIG. 10 illustrates an example provider network (or "service provider system") environment according to some examples. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some examples, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
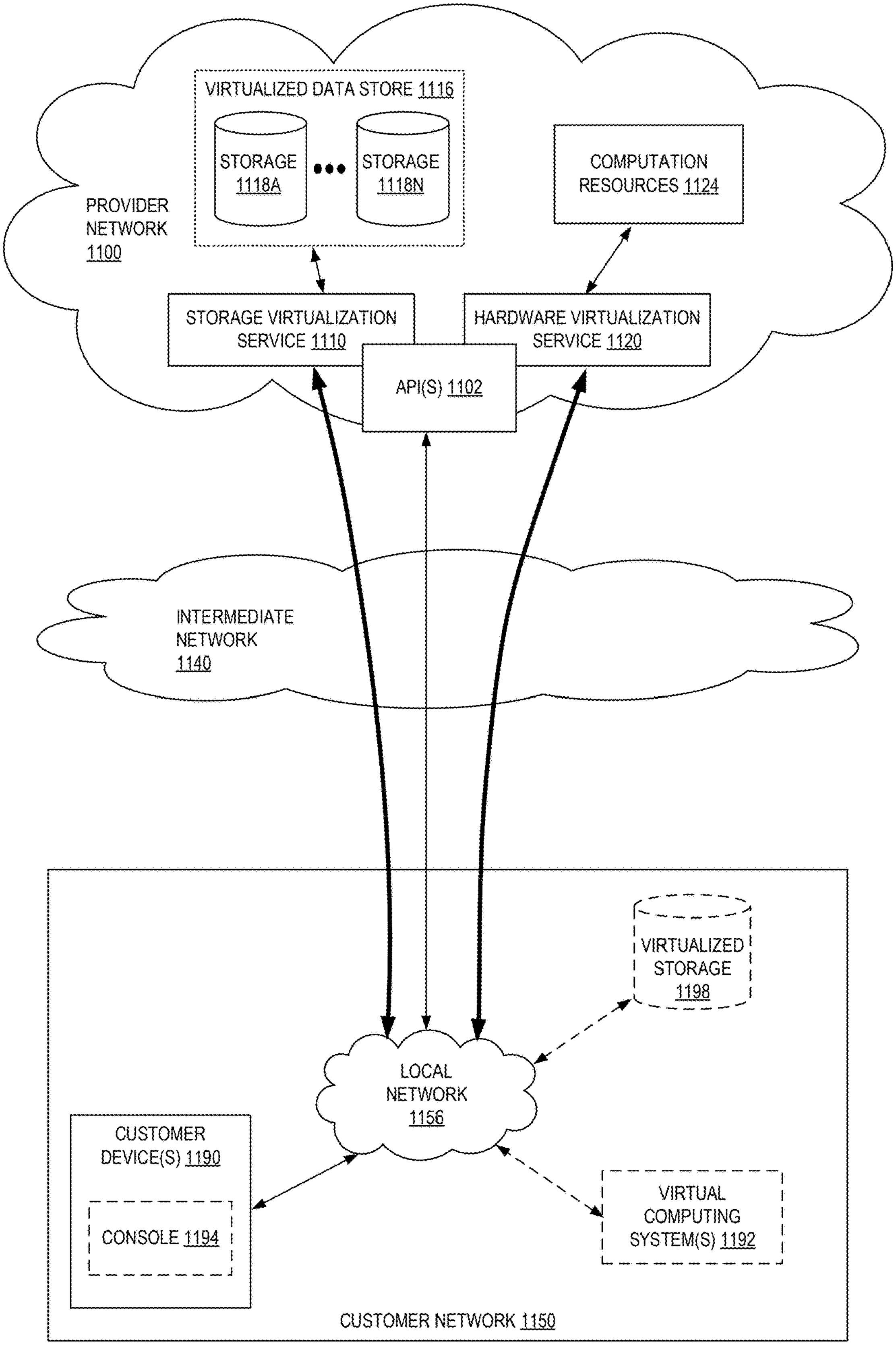
FIG. 11 is a block diagram of an example provider network that provides a storage service and a hardware virtualization service to customers according to some examples.

FIG. 11 is a block diagram of an example provider network that provides a storage service and a hardware virtualization service to customers, according to some examples. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some examples, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some examples, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some examples, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some examples, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
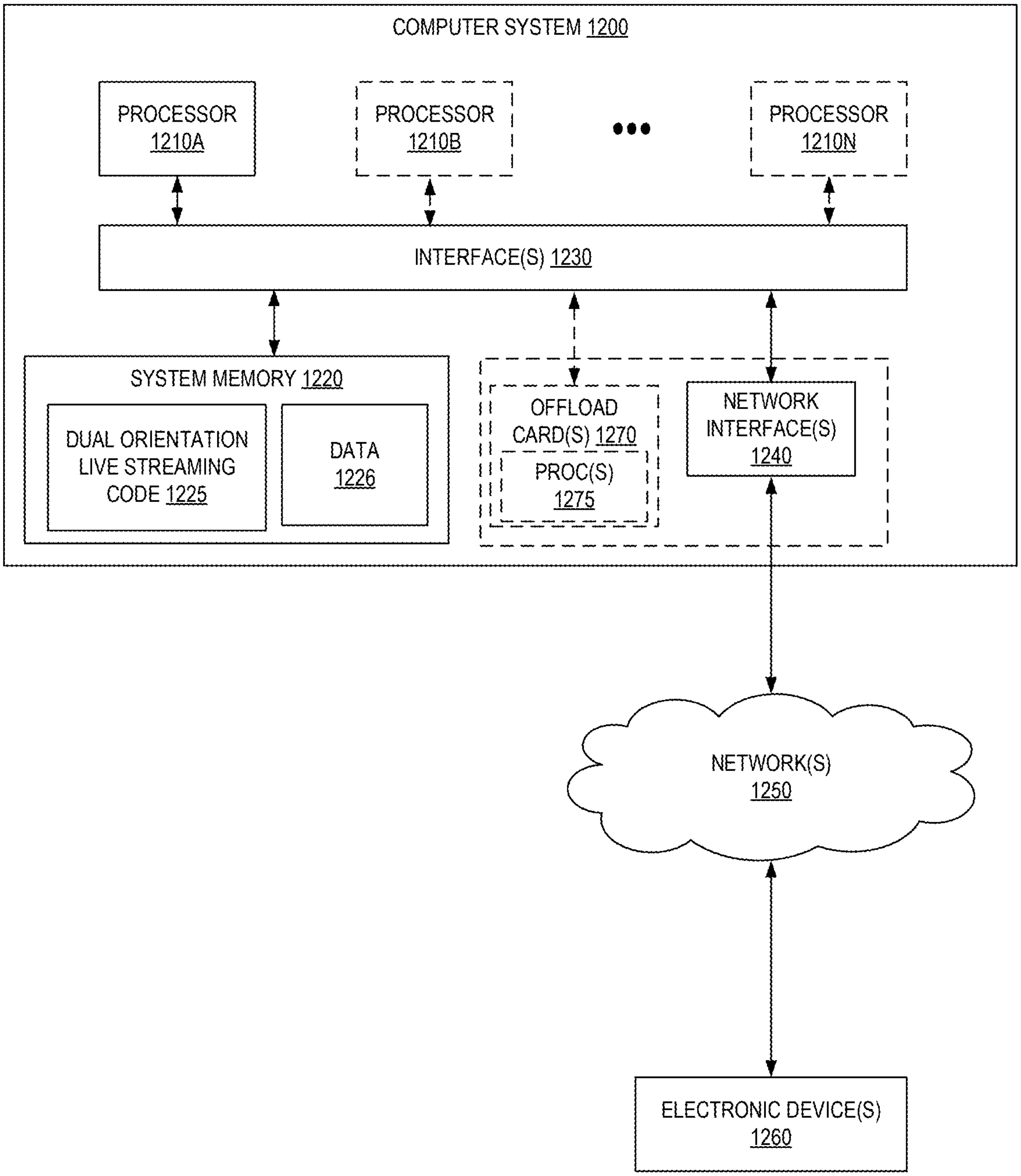
FIG. 12 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1200 illustrated in FIG. 12. In the illustrated example, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various examples a computer system 1200 may include one computing device or any number of computing devices configured to work together as a single computer system 1200.

In various examples, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various examples, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various examples, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1220 as dual orientation live streaming code 1225 (e.g., executable to implement, in whole or in part, the operations discussed herein) and data 1226.

In one example, I/O interface 1230 may be configured to coordinate I/O traffic between processor 1210, system memory 1220, and any peripheral devices in the device, including network interface 1240 or other peripheral interfaces. In some examples, I/O interface 1230 may perform any necessary protocol, timing, or other data transformations to convert data signals from one component (e.g., system memory 1220) into a format suitable for use by another component (e.g., processor 1210). In some examples, I/O interface 1230 may include support for devices attached through various types of peripheral buses, such as a variant of the Peripheral Component Interconnect (PCI) bus standard or the Universal Serial Bus (USB) standard, for example. In some examples, the function of I/O interface 1230 may be split into two or more separate components, such as a north bridge and a south bridge, for example. Also, in some examples some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various examples, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some examples the offload card(s) 1270 can perform compute instance management operations such as pausing and/or un-pausing compute instances, launching and/or terminating compute instances, performing memory transfer/copying operations, etc. These management operations may, in some examples, be performed by the offload card(s) 1270 in coordination with a hypervisor (e.g., upon a request from a hypervisor) that is executed by the other processors 1210A-1210N of the computer system 1200. However, in some examples the virtualization manager implemented by the offload card(s) 1270 can accommodate requests from other entities (e.g., from compute instances themselves), and may not coordinate with (or service) any separate hypervisor.

In some examples, system memory 1220 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
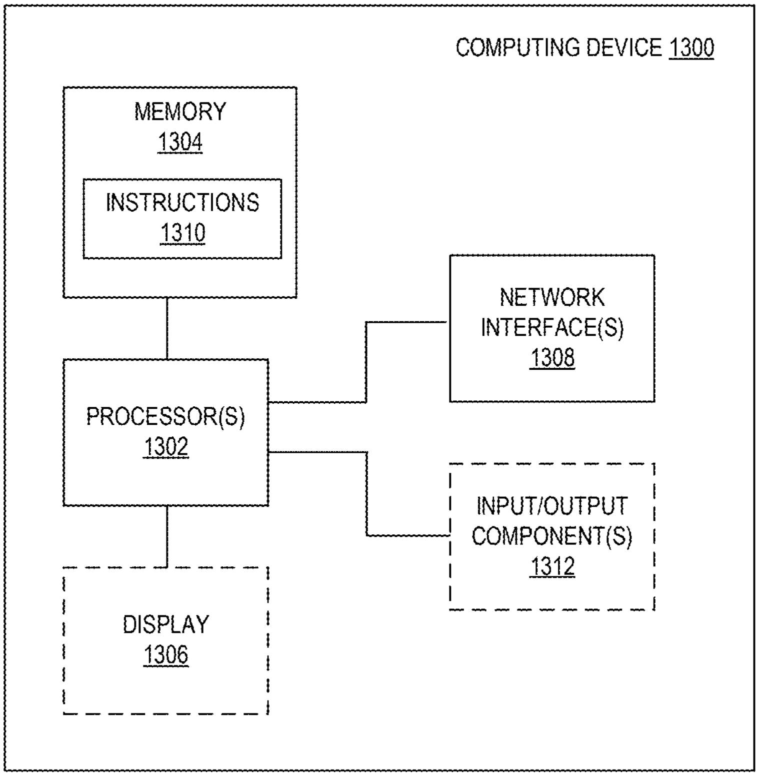
FIG. 13 illustrates a logical arrangement of a set of general components of an exemplary computing device that can be utilized in accordance with various examples.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement a content delivery service as disclosed herein), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various examples may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some examples include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 14:
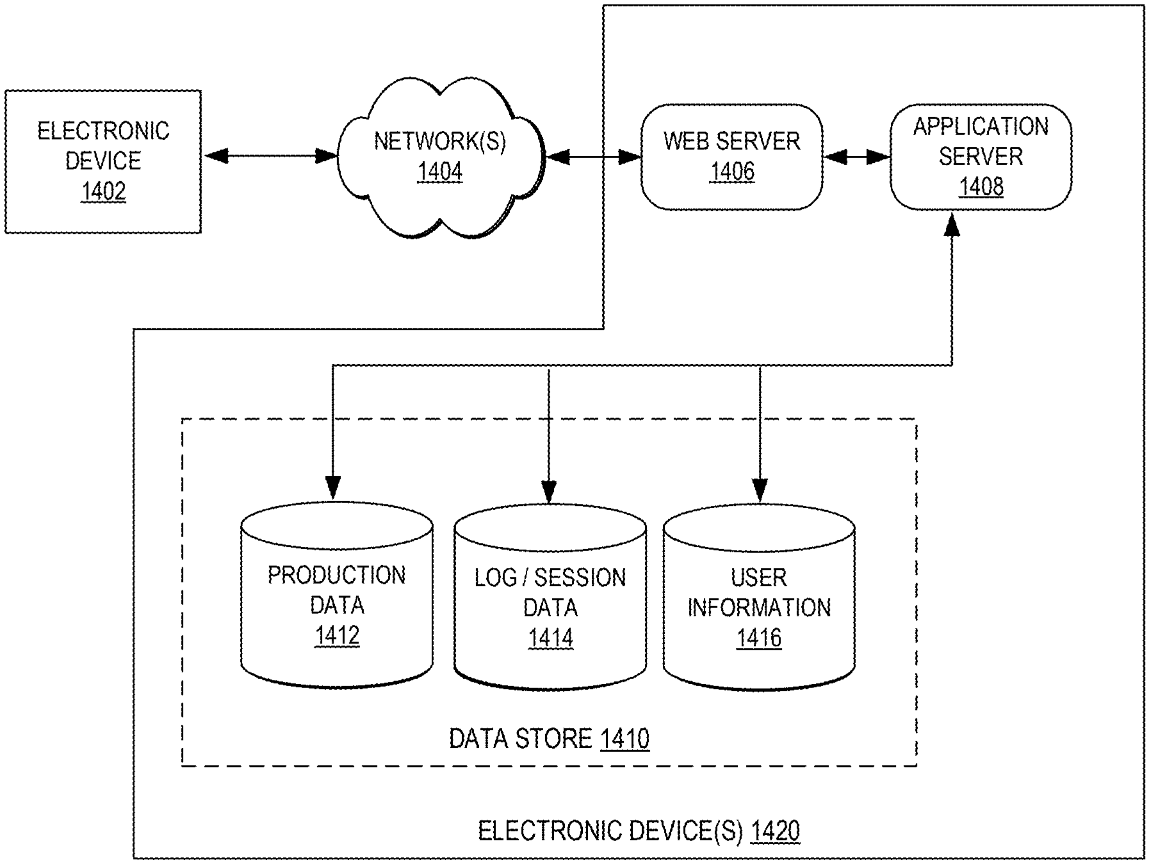
FIG. 14 illustrates an example of an environment for implementing aspects in accordance with various examples.

As discussed, different approaches can be implemented in various environments in accordance with the described examples. For example, FIG. 14 illustrates an example of an environment 1400 for implementing aspects in accordance with various examples. For example, in some examples messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various examples. The system includes an electronic client device 1402, which may also be referred to as a client device and can be any appropriate device operable to send and receive requests, messages, or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory, and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1118A-1118N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, by a content creator device support service from a content creator device, a request to generate a live vertical video stream and a live horizontal video stream from a live stream of a video camera of the content creator device;

sending, by the content creator device support service in response to the request from the content creator device to generate the live vertical video stream and the live horizontal video stream from the live stream of the video camera of the content creator device, an update that the content creator device is able to go live in multiple orientations;

causing, by the content creator device support service, generating of the live vertical video stream from the live stream of the video camera of the content creator device, and the live horizontal video stream from the live stream of the video camera of the content creator device;

causing, by the content creator device support service, inserting of additional content into a first location relative to the live vertical video stream to generate first content comprising the live vertical video stream, whereby the first content is optimized for vertical viewing;

causing, by the content creator device support service, inserting of the additional content into a second location, different than the first location, relative to the live horizontal video stream to generate second content comprising the live horizontal video stream, whereby the second content is optimized for horizontal viewing;

causing, by the content creator device support service, sending of the first content comprising the live vertical video stream to a first user device based on the first user device being a vertical display device; and causing, by the content creator device support service, sending of the second content comprising the live horizontal video stream to a second user device based on the second user device being a horizontal display device.

2. The computer-implemented method of claim 1, wherein the generating the live vertical video stream comprises generating a first private stream key for the live vertical video stream for a broadcast identification value for the live stream, and wherein the generating the live horizontal video stream comprises generating a second private stream key, different than the first private stream key, for the live horizontal video stream for the broadcast identification value for the live stream.

3. The computer-implemented method of claim 1, wherein the additional content comprises a chat window for the content creator device, the first user device, and the second user device.

4. A computer-implemented method comprising:

receiving a request, from a content creator device, to generate multiple orientation-specific media streams, including a first media stream optimized for a first media consumption orientation and a second media stream optimized for a second media consumption orientation, from a media stream of the content creator device;

sending, in response to the request from the content creator device to generate the multiple orientation-specific media streams, an update that the content creator device is able to go live in multiple orientations;

generating the first media stream from the media stream of content creator device, and the second media stream from the media stream of the content creator device;

inserting additional content with the first media stream to generate first content comprising the first media stream;

inserting the additional content with the second media stream to generate second content comprising the second media stream;

sending the first content comprising the first media stream to a first user device optimized for presentation of the first media consumption orientation; and sending the second content comprising the second media stream to a second user device optimized for presentation of the second media consumption orientation.

5. The computer-implemented method of claim 4, wherein the generating the first media stream comprises generating a first private stream key for the first media stream for a broadcast identification value for the stream, and wherein the generating the second media stream comprises generating a second private stream key, different than the first private stream key, for the second media stream for the broadcast identification value for the stream.

6. The computer-implemented method of claim 5, wherein the first private stream key for the first media stream and the second private stream key for the second media stream are generated in response to a same request to generate the broadcast identification value.

7. The computer-implemented method of claim 4, further comprising presenting, to the content creator device, a single user interface element of a user interface to select simultaneous streaming of the first media stream and the second media stream.

8. The computer-implemented method of claim 7, wherein selecting, via the single user interface element of the user interface, the simultaneous streaming of the first media stream and the second media stream causes the inserting of the additional content, and the inserting of the additional content.

9. The computer-implemented method of claim 7, further comprising providing, via the user interface, a first private stream key for the first media stream and a second private stream key for the second media stream.

10. The computer-implemented method of claim 4, further comprising:

validating the first media stream prior to sending the first content comprising the first media stream to the first user device;

validating the second media stream prior to sending the second content comprising the second media stream to the second user device; and presenting a single user interface element, in a user interface of the content creator device in response to successful validations of the first media stream and the second media stream, that causes the sending of the first content comprising the first media stream and the sending of the second content comprising the second media stream in response to selection.

11. The computer-implemented method of claim 4, further comprising:

validating the first media stream during the sending of the first content comprising the first media stream to the first user device;

validating the second media stream during the sending of the second content comprising the second media stream to the second user device;

presenting, in a user interface of the content creator device in response to an unsuccessful validation of the first media stream, an indication of the unsuccessful validation of the first media stream; and presenting, in the user interface of the content creator device in response to an unsuccessful validation of the second media stream, an indication of the unsuccessful validation of the second media stream.

12. The computer-implemented method of claim 4, wherein the additional content comprises a chat window for the content creator device, the first user device, and the second user device.

13. The computer-implemented method of claim 4, wherein the additional content comprises an indication of a product or service displayed on the content creator device, the first user device, and the second user device.

14. The computer-implemented method of claim 4, further comprising presenting, in a user interface of the content creator device, combined user interaction metrics for the first content comprising the first media stream and the second content comprising the second media stream.

15. A non-transitory computer-readable medium storing code that, when executed by a device, causes the device to perform a method comprising:

receiving a request, from a content creator device, to generate multiple orientation-specific media streams, including a first media stream optimized for a first media consumption orientation and a second media stream optimized for a second media consumption orientation, from a media stream of the content creator device;

sending, in response to the request from the content creator device to generate the multiple orientation-specific media streams, an update that the content creator device is able to go live in multiple orientations;

generating the first media stream from the media stream of the content creator device, and the second media stream from the media stream of the content creator device;

inserting additional content with the first media stream to generate first content comprising the first media stream;

inserting the additional content with the second media stream to generate second content comprising the second media stream;

sending the first content comprising the first media stream to a first user device optimized for presentation of the first media consumption orientation; and sending the second content comprising the second media stream to a second user device optimized for presentation of the second media consumption orientation.

16. The non-transitory computer-readable medium of claim 15, wherein the generating the first media stream comprises generating a first private stream key for the first media stream for a broadcast identification value for the stream, and wherein the generating the second media stream comprises generating a second private stream key, different than the first private stream key, for the second media stream for the broadcast identification value for the stream.

17. The non-transitory computer-readable medium of claim 15, wherein the method further comprises presenting, to the content creator device, a single user interface element of a user interface to select simultaneous streaming of the first media stream and the second media stream.

18. The non-transitory computer-readable medium of claim 15, wherein the additional content comprises a chat window for the content creator device, the first user device, and the second user device.

19. The non-transitory computer-readable medium of claim 15, wherein the additional content comprises an indication of a product or service displayed on the content creator device, the first user device, and the second user device.

20. The non-transitory computer-readable medium of claim 15, wherein the method further comprises presenting, in a user interface of the content creator device, combined user interaction metrics for the first content comprising the first media stream and the second content comprising the second media stream.

* * * * *